United States Patent [19]

Fujisaki

[11] Patent Number: 4,868,433
[45] Date of Patent: Sep. 19, 1989

[54] SMALL SIZED ELECTRIC MOTOR

[76] Inventor: Kiyonori Fujisaki, 195-4 Ooyaguchi, Matsudo-shi, Japan

[21] Appl. No.: 885,375

[22] Filed: Jul. 14, 1986

Related U.S. Application Data

[63] Continuation of Ser. No. 591,985, Mar. 21, 1984, abandoned.

[30] Foreign Application Priority Data

Mar. 25, 1983 [JP] Japan ................................. 58-50181

[51] Int. Cl.[4] ............................................. H02K 5/00
[52] U.S. Cl. ............................... 310/40 MM; 310/71; 310/89; 310/154; 310/233; 310/261
[58] Field of Search ................... 310/40 MM, 71, 239, 310/240, 241, 242, 144, 145, 146, 247, 248, 249, 154, 261, 233, 234, 235, 236, 237, 89

[56] References Cited

U.S. PATENT DOCUMENTS

| | | |
|---|---|---|
| 2,939,024 | 5/1960 | Mabuchi ............................. 310/154 |
| 3,171,997 | 3/1965 | Hammer ............................. 310/244 |
| 3,290,528 | 12/1966 | Adler ................................. 310/154 |
| 3,296,473 | 1/1967 | Mabuchi ............................. 310/239 |
| 3,361,917 | 1/1968 | Stahly ................................. 310/154 |
| 3,433,989 | 3/1969 | Leavitt ............................... 310/239 |
| 3,444,409 | 5/1969 | Latta ................................... 310/239 |
| 4,152,614 | 5/1979 | Noguchi ........................ 310/40 MM |
| 4,163,916 | 8/1979 | Kobayashi ......................... 310/248 |

FOREIGN PATENT DOCUMENTS

| | | | |
|---|---|---|---|
| 2747939 | 11/1978 | Fed. Rep. of Germany ...... 310/248 |
| 2725056 | 12/1978 | Fed. Rep. of Germany ...... 310/248 |
| 1333566 | 6/1963 | France ................................ 310/154 |
| 0557290 | 2/1957 | Italy ................................... 310/154 |
| 0069704 | 6/1979 | Japan ................................. 310/233 |

Primary Examiner—R. Skudy
Attorney, Agent, or Firm—Robert F. Ziems

[57] ABSTRACT

A small sized electric motor of a sectionally non-circular housing has a pair of magnets oppositely positioned therein in the lengthwise direction thereof and a rotor positioned between the magnets. A pair of fulcrums oppositely located on the housing in the length-wise direction thereof diametrically across the rotor, and a pair of elongated brushes, each has one end part secured to each of the fulcrums and the other end part elastically pressed against the commutator of the rotor at a point thereof to determine the electric displacement point with the angle 120° displaced with respect to the magnetic line of force caused by the magnets. A winding is wound around the core structure of the rotor and has the initial ends and the wound ends each connected to a predetermined number of connector terminals of the commutator with the angle 120° displaced with respect to the commutator.

4 Claims, 5 Drawing Sheets

SMALL SIZED ELECTRIC MOTOR

This application is a continuation of application Ser. No. 591,985 filed Mar. 21, 1984, now abandoned.

BACKGROUND OF THE INVENTION

The invention relates to a small sized electric motor and more particularly relates to a small sized electric motor which is sectionally non-circular and may be used in various machines and apparatuses and which has the fulcrums of brushes arranged in the direction lengthwise of the section of motor, so that brushes of sufficient length may be used in the small sized electric motor.

The conventional small sized electric motor 1 is generally non-circular in the section thereof as shown in FIG. 3 because a motor of such outer configuration may be more easily attached to the machines and other apparatus. In FIG. 3, the conventional small sized electric motor 1 (called a motor hereinafter) has a sectionally rectangular housing 2, in which a pair of magnets 3, 4 are oppositely arranged in the direction lengthwise thereof and a rotor 5 is rotatably positioned between the two magnets. FIG. 3 shows a triplepolar motor 1 as an example of multipolar motors, in which the rotor 5 is composed of a rotor shaft 7, rotatably journalled in the housing 2, a rotor core structure 8 which is assembled integral with the core shaft 7 and formed with cores 8a, 8b, 8c providing winding carrier parts 8d, 8e, 8f respectively, a winding 9 sequentially wound around the winding carrier parts 8d, 8e, 8f, connector terminals 10 provided between the winding carrier parts respectively and extending radially of the rotor shaft 7. The terminals each having connected thereto the initial and last ends of the winding 9 wound around the winding carrier parts 8d, 8e, 8f, and a commutator 11 mounted on the rotor shaft 7 and providing conductive parts 11a, 11b, 11c and nonconductive parts 11d, 11e, 11f.

The core structure 8 has the winding carrier parts 8d, 8e, 8f arranged around the rotor shaft 7 with a space of 120° therebetween, and accordingly the connector terminals 10a, 10b, 10c are arranged on the commutator 11 with a space of 120° therebetween. Similarly the commutator 11 has the nonconductive parts 11d, 11e, 11f each arranged between the adjacent winding carrier parts 8d, 8e, 8f with a space of 120° therebetween around the rotor shaft 7.

The winding 9 has the initial end anchored, for example, to one 10a of the connector terminals 10 of the commutator 11, and then is wound a predetermined number of times around the winding carrier part 8b of the cores. The wound end 9b is anchored to the next connector terminal 10b where the initial end 9c of the winding 9 starts again to be wound around the next winding carrier part 8f of the cores. After the winding 9 has been wound the predetermined times around the winding carrier part 8f, the wound end 9d is then anchored to the next connector terminal 10c where the initial end 9e of the winding 9 starts again to be wound around the next winding carrier part 10c. After the winding 9 has been wound the predetermined number of times around the winding carrier part 10c, the wound end 9f is then anchored to the initial connector terminal 10a. Then the initial and wound ends of the winding 9 are each welded to the respective connector terminals A pair of linear brushes 12, 13, which are passed against the commutator 11 on the opposite sides thereof with the an elasticity of their own, have the respective base ends 12a, 13a secured to the associated fulcrums 14, 15 which are provided with a predetermined space therebetween on one side of the housing 2 in a direction laterally thereof. Therefore the brush terminals (not shown), which are to be connected to a power supply (not shown), are designed to outwardly project side by side from the side of the housing 2 in the direction laterally thereof.

The brushes 12, 13 are adapted to cooperate with the nonconductive parts 11d, 11e, 11f of the commutator 11 as the rotor 5 is rotated to thereby change over the direction of electric current flowing through the winding 9 wound around the winding carrier parts 8d, 8e, 8f of the cores 8a, 8b, 8c, i.e. to determine the electric displacement position of the commutator 11, so that the rotor 5 may be continuously rotated. In this case, the nonconductive parts 11d, 11e, 11f are positioned in alignment with the center axes of the respective winding carrier parts 8d, 8e, 8f of the core structure 8, and accordingly the electric displacement position of the commutator 11 is 0° with respect to the magnetic line of force M of the magnets 3, 4. Namely if the rotor 5 is rotated in the direction as shown by an arrow A, the direction of electric current flowing through the winding 9 on the winding carrier part 8e is changed over when the nonconductive part 11f of the commutator 11 contacts the brush 12. When the nonconductive part 11e contacts the brush 13, the direction of electric current flowing through the winding 9 of the winding carrier part 8d is changed over, and when the nonconductive part 11d contacts the brush 12, the direction of electric current flowing through the winding 9 of the winding carrier part 8c is changed over. Thus the rotor 5 is continuously rotated.

Now according to the conventional motor 1, since the brushes 12, 13 are arranged extending in parallel with each other from one side of the casing 2 in the direction laterally thereof in such a manner as to transverse the magnetic line of force M of the magnets 3, 4, the length of the brushes 12, 13 is extraordinarily delimited with respect to the commutator 11. Namely in the prior art, since the distance is very short between the fulcrum of each brush and a point of the commutator where the brush contacts the commutator, the pressing variation of the brush is accordingly large to the extent that the contact of the brush with the commutator is not stabilized, and therefore the output of the motor is lowered. Further as the brushes and commutator come to be worn down, the contact angle of brushes with respect to the commutator will be remarkably varied, and accordingly the electric displacement position is varied. As the result, the output of the motor is further lowered. Still further, in the assembling operation, it is almost impossible to avoid the variations of angle with which the brushes are attached to the fulcrums. Such variations of attaching angle will inevitably result in variations of pressure with which the brushes contact the commutator. The foregoing disadvantages have been typical in the small sized electric motor.

BRIEF SUMMARY OF THE INVENTION

The present invention has been provided to eliminate such disadvantages of the prior art. It is therefore a primary object of the invention to provide an improved small sized electric motor in which the distance is made as long as possible between the fulcrums to which the brushes are attached and the points at which the brushes contact the commutator so as to reduce the pressure variation of brushes with respect to the commutator to thereby cause the brushes to constantly follow the commutator, thus to prevent the output of the motor from being deteriorated. It is another object of the invention to maintain a constant contact angle of the brushes to the commutator even if the brushes and commutator are worn down during the practical use of the motor, to thereby maintain the constant electric displacement position of the commutator, thus to prevent the output of the motor being deteriorated. It is still another object of the invention to solve the problem caused by displacement of the electric displacement position resulting from the elongation of brushes according to the invention, simply by properly displacing the anchoring positions of the winding on the rotor core structure without changing the position of the commutator relative to the rotor core structure.

In short, the invention has been made to provide a small sized electric motor of a sectionally non-circular housing having a pair of magnets oppositely located therein in the lengthwise direction thereof and a rotor positioned between the magnets, said rotor being composed of a rotor shaft, a core structure, a commutator and a plurality of connector terminals, said electric motor comprising a pair of fulcrums oppositely located on the housing in the lengthwise direction with respect to a cross section thereof; a pair of elongated brushes each having one end part secured to each of the fulcrums and having the other end part elastically pressed against the commutator at a point thereof with a predetermined angle displaced with respect to the magnetic line of force which is caused by the magnets, to thereby determine a predetermined electric displacement position thereat; and a winding wound around the core structure, said winding having the initial ends and the wound ends each connected to each of the connector terminals with a predetermined angle displaced with respect to the commutator corresponding to the predetermined angle of each brush, wherein the displacement of the electric displacement position is compensated by the specific connections of the winding on the rotor. More precisely, the motor is a triplepolar electric motor and has the pair of elongated brushes each having one end part secured to each of the fulcrums and having the other end contacting the commutator at a point thereof with the angle 120° displaced with respect to the magnetic line of force caused by the magnets, and the winding having the initial ends and the wound ends each connected to each of the connector terminals with the angle 120° displaced accordingly with respect to the commutator.

Another aspect of the invention is to provide a method for producing a small sized electric motor of a sectionally non-circular housing having a pair of magnets located therein in the lengthwise direction with respect to cross section thereof and a rotor positioned between the magnets, said rotor being composed of a rotor shaft, a core structure, a commutator and a plurality of connector terminals, said method comprising the steps of positioning a pair of fulcrums opposite to each other on the housing in the lengthwise direction with respect to a cross section thereof; securing a pair of elongated brushes each at one end part to each of the fulcrums and elastically pressing the brushes each at the other end part against the commutator at a point thereof with a predetermined angle displaced with respect to the magnetic line of force which is caused by the magnets, to thereby determine a predetermined electric displacement position thereat; and winding a winding around the core structure in a manner that the initial ends and the wound ends are each connected to each of the connector terminals with a predetermined angle displaced with respect to the commutator corresponding to the predetermined angle of each brush, wherein the displacement of the electric displacement position is compensated by the specific connections of the winding on the rotor. More precisely, the method is to produce a triplepolar electric motor, said method securing the pair of elongated brushes each at one end part to each of the fulcrums and contacting the brushes each at the other end part against the commutator at a point thereof with the angle 120° displaced with respect to the magnetic line of force, and winding the winding around the core structure in a manner that the initial ends and the wound ends are each connected to each of the connector terminals with the angle 120° displaced accordingly with respect to the commutator.

BRIEF DESCRIPTION OF THE DRAWINGS

The other features and advantages of the invention will be apparent from the following description of preferred embodiments in reference to the attached drawings, in which.

DETAIL DESCRIPTION OF THE INVENTION

Figure 1:
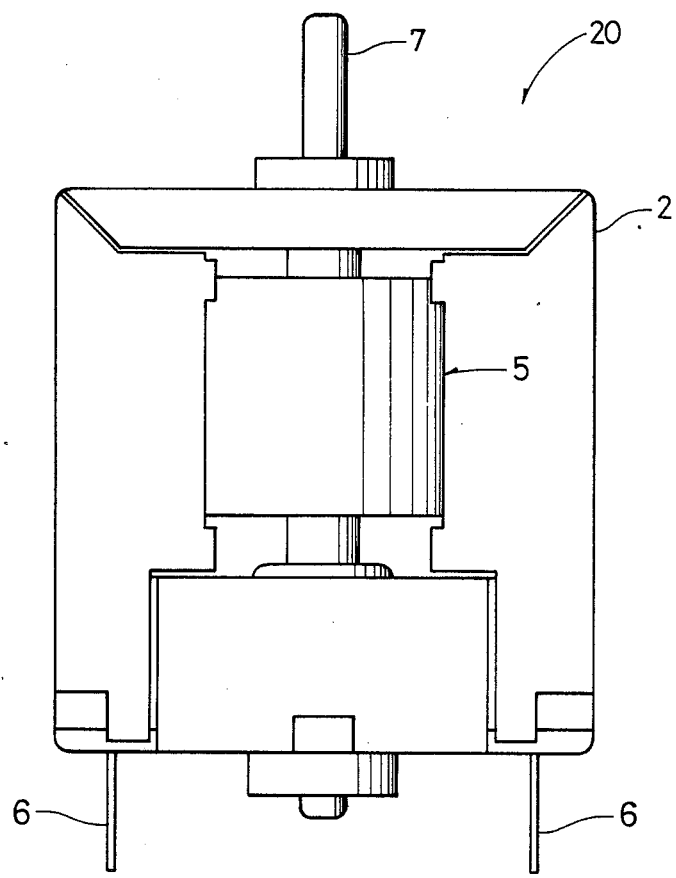
FIG. 1 is a plan view of a small sized electric motor of a sectionally non-circular housing according to the invention.
Figure 2:
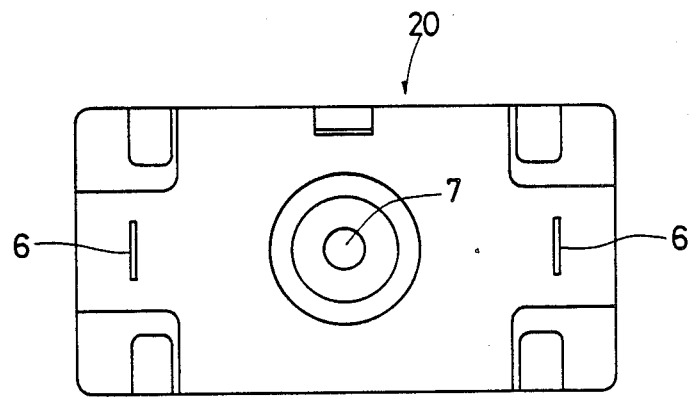
FIG. 2 is an end view of the electric motor as shown in FIG. 1.
Figure 3:
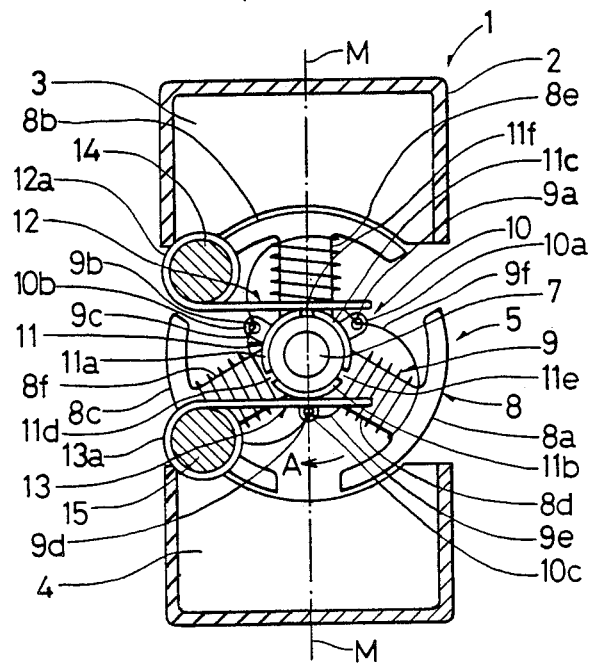
FIG. 3 is a sectioned view of the conventional small sized electric motor of a sectionally non-circular housing.
Figure 4:
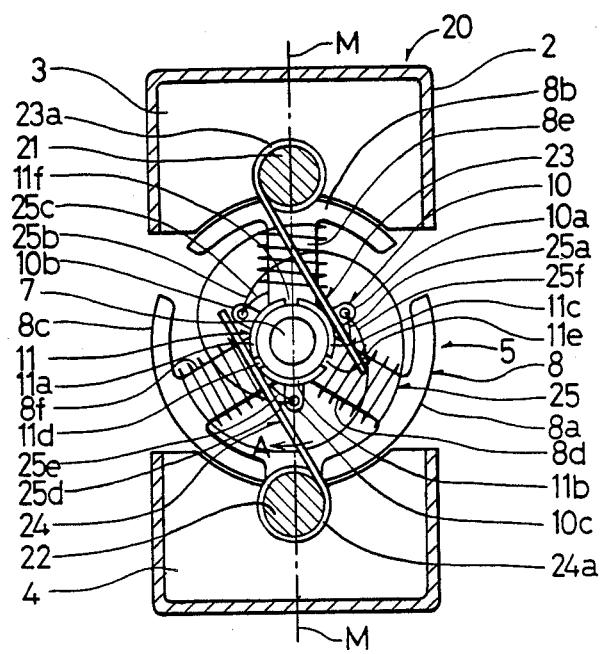
FIG. 4 is a sectioned end view of the electric motor as shown in FIGS. 1 and 2.
Figure 5:
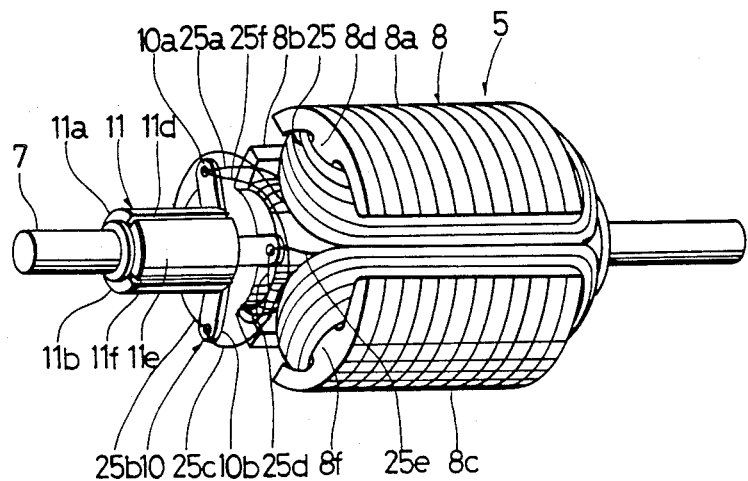
FIG. 5 is a perspective view of a rotor of the electric motor as shown in FIG. 4.
Figure 6:
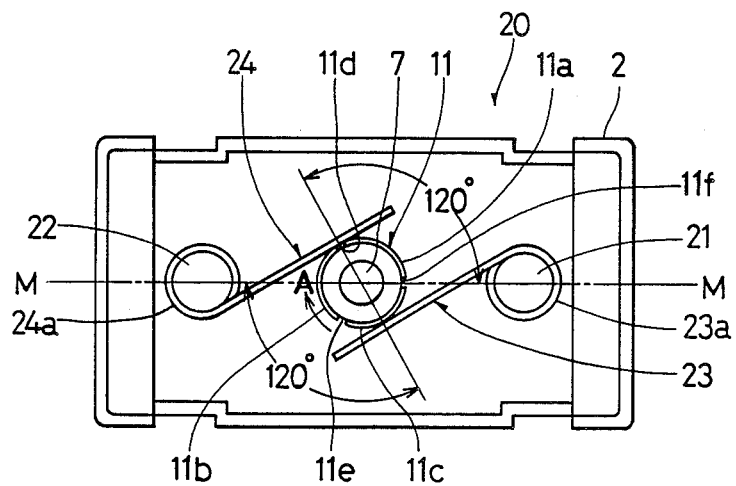
FIG. 6 is a diagrammatic end elevational view of the electric motor of the invention showing the relation between the brushes and the commutator.

In reference to FIGS. 4 to 6 showing a preferred embodiment of the invention with the same reference numerals as those in FIGS. 1 to 3 being attached to the parts thereof common to those of the conventional motor, but the the parts of inventiveness being indicated with different reference numerals. the embodiment of the invention would be fully understood with the explanation only as to the parts thereof different from those of the conventional motor.

A motor 20 has a pair of fulcrums 21, 22 positioned opposite to each other on the housing 2 in the lengthwise direction thereof and on the magnetic line M of force caused by the magnets 3, 4. A pair of elongated brushes 23, 24 have each one end part 23a (24a) secured to each of the fulcrums 21, 22 and have each the other end part elastically pressed against the commutator 11. Accordingly a pair of brush terminals 6, as shown in FIGS. 1 and 2 to be connected to a power supply (not shown), are arranged on opposite sides of the rotor 5 in the lengthwise direction of the housing 2 with respect to a cross section thereof and are projected out therefrom.

As shown, in this case the point at which each brush 23(24) contacts the commutator 11 varies by the angle 60° compared with the conventional case as shown in FIG. 3, with each brush 23 (24) being displaced by the angle 30° with respect to the magnetic line M of force. Accordingly there arises a problem that the electric displacement position of the commutator 11 varies by the angle 120°.

This problem will however be solved by changing the connecting positions of a winding 25 with respect to the commutator 11. Namely at first the initial end 25a of the winding 25 is anchored, for example, to one 10a of the connector terminals 10 and then the winding 25 is wound a predetermined number of times around the winding carrier part 8d of the core 8a of the core structure 8. The wound end 25b of the winding 25 is then anchored to the connector terminal 10b which is displaced 120° from the connector terminal 10a. Then from the next initial end 25c the winding 25 is wound around the winding carrier part 8e of the core 8b and the wound end 25d is then anchored to the connector terminal 10c which is displaced 120° from the connector terminal 10b. Then from the next initial end 25e the winding 25 is wound around the winding carrier part 8f of the core 8c and the wound end 25f is then anchored to the connector terminal 10a which is displaced 120° from the connector terminal 10c. Then the initial ends and the wound ends are welded to the connector terminals 10a, 10b, 10c respectively.

With the structure of the invention as mentioned above, the operation is as follows: In reference to FIGS. 4 to 6, if the brush terminals 6 in FIG. 1 are connected to the power supply (not shown), the commutator 11 is energized through the brushes 23, 24, and therefore the cores 8a, 8b, 8c of the core structure 8 are energized through the winding 25, and then the rotor 5 is rotated, for example, in the direction indicated by an arrow mark A in relation with the magnetic line M of force which is caused by the magnets 3, 4. While the rotor 5 is rotated, the winding carrier part 8e of the core 8b is positioned in alignment with the magnetic line M of force when the nonconductive part 11d of the commutator 11 comes into contact with the brush 24. It is this time that the electric current flowing through the winding 25 on the winding carrier part 8e is changed over. Namely the electric current is changed over with the electric displacement position of the commutator 11 being displaced by the angle 120° with respect to the magnetic line M of force as advanced in the rotational direction of the rotor 5 because of the initial end 25c and the wound end 25d of the winding 25 being connected to the connector terminals 10b and 10c respectively. Thus the electric displacement position for the core 8b is unchanged in effect from that of the prior art as shown in FIG. 3. Similarly if the nonconductive part 11f of the commutator 11 comes to contact the brush 23, the direction of the electric current flowing through the winding 25 on the core 8a is changed over, and if the nonconductive part 11e of the commutator 11 comes to contact the brush 24, the direction of the electric current flowing through the winding 25 on the core 8c is changed over. Thus the rotor 5 is continuously rotated.

As is understood from the foregoing explanation, since the fulcrums 21, 22 are positioned opposite to each other across the rotor 5 in the lengthwise direction of the sectioned housing 2 and on the magnetic line M of force caused by the magnets 3, 4, there may be used the brushes 23, 24 which are remarkably longer than the conventional ones to thereby reduce the pressure variation of brushes accordingly to the extent that no angular variation of brushes is substantially caused if the brushes and the commutator are worn down. Further according to the invention, the winding 25 may be easily wound around the winding carrier parts 8d, 8e, 8f with a repeated operation cycle such as firstly anchoring the initial 25a, for example, of the winding 25 to the connector terminal 10a and then rotating the core structure 8 by the angle 60° in one direction to wind the winding 25 around the winding carrier part 8d, and then rotating the core structure 8 in the opposite direction by the angle 180° to anchor the wound end 25b of the winding 25 to the connector terminal 10b.

Figure 7:
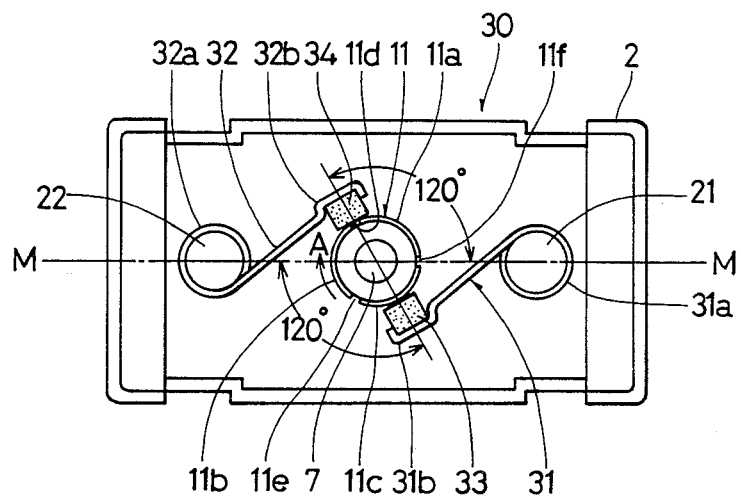
FIG. 7 is a diagrammatic end elevational view of a second embodiment according to the invention.

In reference to FIG. 7 showing a second embodiment of the invention having the same reference numerals attached to the parts thereof which are common with those of the first embodiment as mentioned above, a motor 30 has the fulcrums 21, 22 oppositely arranged across the rotor 5 in the lengthwise direction of the housing 2. A pair of elongated torsion springs 31, 32 twisted in one direction have each a twisted end 31a (32a) secured to each of the fulcrums 21, 22 and a free end bent into a recess 31b (32b). A pair of brush elements 33, 34 are fixedly positioned in the recesses 31b, 32b respectively and are pressed against the commutator 11 opposite to each other diametrically thereacross due to the elasticity of the torsion springs 31, 32.

Figure 8:
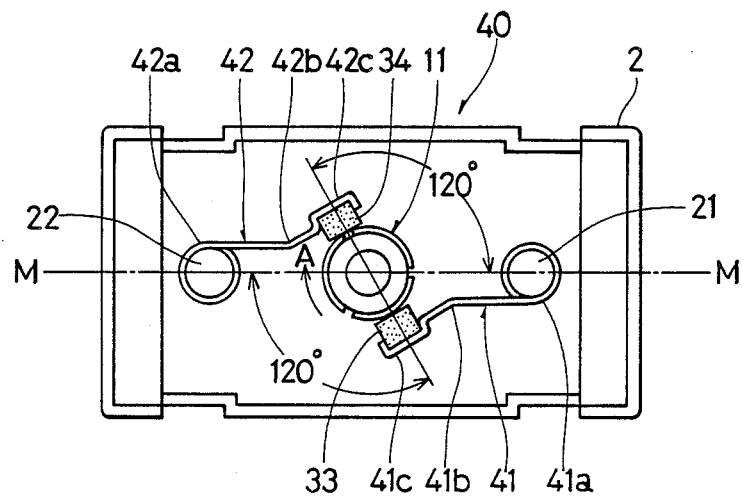
FIG. 8 is a diagrammatic end elevational view of a third embodiment according to the invention.

In reference to FIG. 8 showing a third embodiment of the invention having the same reference numerals attached to the parts thereof which are common with those of the second embodiment as mentioned above, a motor 40 has a pair of elongated torsion springs 41, 42 provided therein. The torsion springs 41, 42 are each twisted in the direction opposite to the twisted direction of the torsion springs in the second embodiment, and have each a twisted end 41a (42a) secured to each of the fulcrums 21, 22 and a free end bent into a recess 41c (42c). The brush elements 33, 34 are fixedly positioned in the recesses 41c, 42c respectively. The torsion springs 41, 42 are each bent at a point 41b (42b) thereof with a predetermined angle directed away from the magnetic line M of force so that the brush elements 33, 34 may be pressed against the commutator 11 opposite to each other diametrically thereacross with the electric displacement position being maintained at the angle 120° displaced with respect to the magnetic line M of force.

The second and third embodiments of the invention are each slightly modified from the first embodiment, but the effect is substantially same.

The invention has been explained in reference to the embodiments of a triplepolar motor, but is not limited to this type of motor. The invention may, of course, be applied to the motor of four or more poles. For example, as to the four-pole motor, the brushes will be extended in parallel with the magnetic line of force so as to obtain the electric displacement position displaced the angle 90° with respect to the magnetic line of force, and the winding wound around the core structure will have the initial ends and the wound ends each connected to the connector terminals 10 of the commutator 11 with the angle 90° being displaced with respect to the commutator 11.

What is claimed is:

1. In a small sized electric motor including a housing of rectangular cross section to define a section length and a section width, a rotor having a rotor shaft journalled in the housing on an axis normal to said cross section and located centrally of said section length and of said section width, a core having a diameter substantially equal to the section width, a commutator concentric with said rotor shaft and having a plurality of connector terminals, and a pair of magnets positioned on opposite sides of said rotor core structure to establish a magnetic line of force parallel to said section length and centrally of said section width, the improvement comprising:

a pair of fulcrums located in the housing on opposite sides of a medial plane containing said shaft axis and perpendicular to said section length, said fulcrums being spaced from one another by a distance greater than said section width;

a pair of elongated brushes each having one end portion secured to one of said fulcrums and having another end portion elastically pressed against said commutator at a point thereon displaced from said magnetic line of force by a predetermined angle, thereby to establish a predetermined electric displacement position; and a winding on said core structure, said winding having initial ends and wound ends each connected to said connector terminals, respectively, said terminals being displaced with respect to said commutator at a displacement angle corresponding to the predetermined angle of each brush, wherein the location of said electric displacement position is accommodate by the connections of the rotor winding to said connector terminals.

2. An electric motor as defined in claim 1 wherein said displacement angle is equal to 120°.

3. A motor as defined in claim 1 wherein said pair of fulcrums are positioned in a plane containing the magnetic line of force.

4. An electric motor as define in claim 1 wherein said brushes include a conductive torsion spring.

* * * * *